Aug. 13, 1940. W. E. KRUMDICK 2,211,064
FISHHOOK
Original Filed March 23, 1936

Inventor
Walter E. Krumdick
By Charles J. Wilson
Attorney

Patented Aug. 13, 1940

2,211,064

UNITED STATES PATENT OFFICE 2,211,064

FISHHOOK

Walter E. Krumdick, Mercer, Wis., assignor of one-half to Peter Kirbach, Rest Lake, Wis.

Application March 23, 1936, Serial No. 70,379
Renewed December 30, 1939

6 Claims. (Cl. 43—40)

This invention relates to fishhooks and has for its object the provision of a device of this character for use in conjunction with live bait and also artificial bait in the form of a fish, which, once having been swallowed by a game fish, cannot be ejected or become disengaged from the interior of the fish mouth or body. While, for want of a better phrase the present invention is entitled "Fishhook", it is in fact, hookless or barbless, and contemplates a structure that cannot become tangled or caught among weeds, growths or any other objects present in the water and will not alarm the game fish prior to becoming firmly fixed in its body or mouth.

With the above and other objects in view, as will be apparent, this invention consists in the construction, combination and arrangement of parts, all as hereinafter more fully described, claimed and illustrated in the accompanying drawing, wherein:

Figure 1:
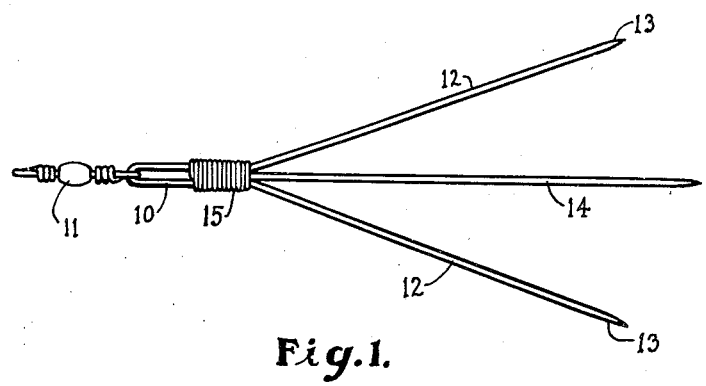
Fig. 1 is a plan view of the present device, showing the normal position of the parts thereof.
Figure 2:
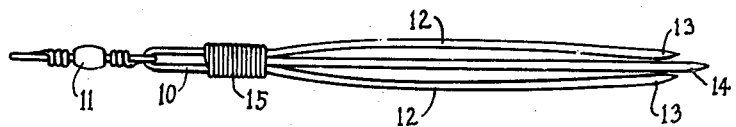
Fig. 2 is a similar view disclosing the relative positions of the parts just prior to the insertion of the device into a bait fish.
Figure 3:
Fig. 3 is a side elevation thereof.

Heretofore, many different types of fishing gear and hooks have been used in conjunction with live bait for the catching of game fish such as muskalonge, pike, and other types attracted by live bait, i. e. other and smaller fish, dead or alive, or even artificial bait. All of these prior devices have attached the live bait, or artificial usually consisting of comparatively small fish or bait, to a device in which is incorporated one or more hooks, generally extending through the body of the bait fish, or artificial bait.

Hence, when swallowing the bait and hook, or hooks, the game fish generally becomes instantly aware of the hook or hooks coacting with the bait fish, and consequently frequently ejects it after more or less struggle thereby being lost to the angler.

Furthermore, these prior hooks or fishing gear usually have protruding parts and hooks which easily, and frequently do, become entangled or engaged among objects in the water, particularly weeds, grass, roots and the like. The present invention contemplates a device, which for want of a better name is called a "fishhook," that is strictly hookless, cannot be ejected from the game fish once having been swallowed, or caught, and cannot become entangled or caught among any growths or other objects in the water.

It is well known that game fish such as muskalonge, pike, bass, etc., the catching of which involves the use of live bait or artificial bait in one form or another, swallow or engage the bait fish head first. Of course, the several varieties of such game fish treat the bait after it is taken before swallowing or engaging it, in different ways, but invariably, the bait fish is swallowed or engaged by a game fish head first. For instance, a muskalonge strikes the bait fish from the side at or near the approximate center of its body taking it to, or near, the bottom of the water. There the muskalonge cleans the bait fish and after a short interval swallows it head first.

Reference being had more particularly to the drawing, 10 designates a metallic loop of wire or other suitable material, at one end of which is attached a swivel 11 whereby the line may be secured to the device. Any type of fishing line may be used in connection with this device, though usually in catching game fish a wire lead is attached to the swivel 11.

This loop 10 is formed by bending or rebending a wire or other metallic strip upon itself, creating two spring arms 12, the ends 13 of which are sharpened or pointed. In normal position these arms diverge from the inner terminal of the loop 10. Interposed between the two divergent arms 12 is a central member 14 which may be of any length, but is preferably substantially the same length as, or somewhat longer than the arms 12. The inner extremity of the central member 14 is positioned between the inner extremities of the divergent spring arms 12 and the inner extremities of these three elements are firmly, rigidly and permanently secured together in any suitable manner, here shown as being a wire 15 wrapped about the inner extremities of the arms 12 and central member 14. This joint 15 between the inner ends of the arms 12 and the inner end of the central members 14 constitutes the inner extremity of the loop 10.

In use the pointed ends 13 of the spring arms 12 are compressed to lie adjacent the central member 14, whereupon the pointed extremities of the arms 12 and the central member 14 are inserted in the mouth of the bait fish, the central member 15 entering directly into the body of the bait fish, usually along the backbone. After the pointed extremities of these members have been inserted in the mouth of the bait fish, the pressure is removed gradually from the arms 12 which permit the extremities 13 thereof to move away from the central member 14. As the entire device is pushed into the mouth of a bait fish the divergent arms 12 pass outwardly through its gills and the pointed extremities 13 thereof extend or project beyond the body of the bait fish in the general direction of its tail. Any suitable means may be employed to secure or tie the present device in its cooperative relation to the bait fish.

When the game fish swallows the bait mounted on the present device, the pointed extremities 13 do not cause him any noticeable inconvenience nor do they startle the game fish but after they have passed its gullet and entered its body any effort to dislodge the device, escape, or eject the bait fish is overcome and prevented by the sharpened points 13 of the divergent arms 12 by their becoming further embedded.

Manifestly, when the present hook or device is properly positioned in the bait fish it is impossible for either the bait or the device to be entangled or catch on any growths or objects in the water.

Where the phrase "game fish" is used herein it is intended not to mean any particular type of fish, but to include all fish which an effort is made to catch or capture.

What is claimed is:

1. In a device of the character described, a central member adapted to be positioned centrally in the body of a bait fish, and a pair of normally divergent spring members adapted to project through the body of a bait fish at an angle to the central member in the direction of the tail thereof.

2. A device of the class described, comprising a pair of divergent arms adapted to project through and from the body of a bait fish in the direction of its tail, and a loop at the junction of said arms.

3. A device of the class described, comprising a pair of divergent spring arms adapted to project through and from the body of a bait fish in the direction of its tail, and a loop at the junction of said arms.

4. A device of the class described, comprising a single section of metal rebent to form a loop and spring arms diverging from said loop, a central member having one end disposed between the adjacent extremities of said divergent arms, and means for securing the adjacent terminals of said divergent arms and said central member together.

5. A device of the class described, comprising a single section of metal rebent to form a loop and divergent spring arms, a central member disposed between the adjacent extremities of said divergent arms, and means for securing the adjacent terminals of said divergent arms and said central member together, thereby closing and completing said loop.

6. A device of the character described comprising a relatively long pointed central member in combination with a pair of shorter pointed spring arms coplanar with each other and with said central member fixed at their inner ends to the unpointed end of the central member and diverging upon opposite sides therefrom.

WALTER E. KRUMDICK.